July 14, 1931.                A. NARATH                  1,814,843
                               KERR CELL
                          Filed Dec. 26, 1929
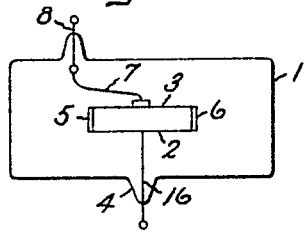
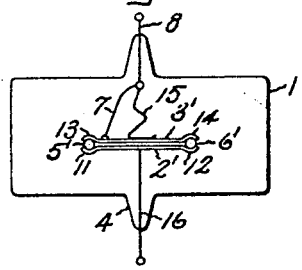
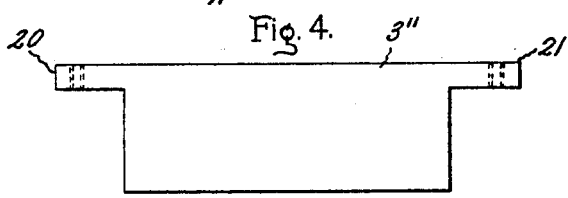
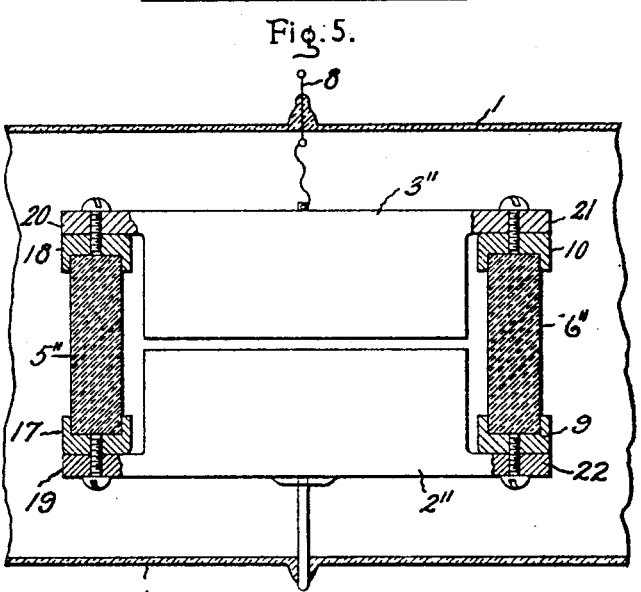
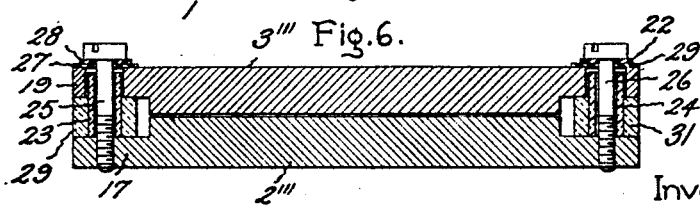
Inventor:
Albert Narath,
by Charles E. Tullar
His Attorney.

Patented July 14, 1931

1,814,843

UNITED STATES PATENT OFFICE

ALBERT NARATH, OF BERLIN, GERMANY, ASSIGNOR TO GENERAL ELECTRIC COMPANY, A CORPORATION OF NEW YORK

KERR CELL

Application filed December 26, 1929, Serial No. 416,318, and in Germany June 4, 1929.

My invention relates to devices for modulating light in accordance with electrical signals and has for its principal object the provision of an improved device of this character which is not subject to deterioration or disarrangement of its various parts during its operation.

Light control devices such as Kerr cells are operated preferably with a small distance between the electrode plates. It is difficult, however, to obtain and maintain the required uniform spacing between the plates, more particularly when both electrodes are held in position by their current leads, which are fused to the glass wall. The distance between the electrodes may become easily altered, for example by the action of heat, when the cell is in operation and as a result current may flow between the electrodes accidentally and the uniformity of electrical and optical values of the cell may be detrimentally affected.

These difficulties are obviated in the present invention by securing the electrodes together with the aid of insulating spacers, the set of electrodes being held in position by the current lead of one of the electrodes or by supporting it on the glass wall or on a suitable foundation secured to the latter. To this end, the electrodes are provided with recesses or projections between which the spacers are located. These spacers should preferably be long as compared with the distance between the electrodes so that it becomes a simple matter to obtain very small distances between the electrodes. The spacers are preferably made of insulating material which may for example be glass or quartz. In view of the action of heat on the distance between the plates, these spacers should, whenever possible, be made of a material unaffected by heat such for example as quartz.

My invention will be better understood from the following description when considered in connection with the accompanying drawings and its scope will be pointed out in the appended claims.

Referring to the drawings Fig. 1 is a side view of a Kerr cell embodying my invention; Fig. 2 is a similar view showing a modified form thereof; Fig. 3 is a detailed view of the electrode employed in the form of my invention shown in Fig. 2; Figs. 5 and 6 are fragmentary views of a Kerr cell comprising two other modified forms of my invention; and Fig. 4 is a detailed view of the form of electrode employed in the modification shown in Fig. 5.

Figure 1 shows a simple constructional example according to this invention. A glass vessel 1 contains the Kerr cell with its electrodes 2 and 3, of which the electrode 2 is held by its lead-in 16 sealed at the point 4. Two insulation members 5 and 6 made of glass, quartz or the like are cemented to the electrode 2, and the electrode 3 is in turn cemented to these insulation members. The electrode 3 is provided with a lead wire 7 used only for the supply of current and connected to the lead-in 8 sealed in the glass. This wire 7 is preferably made of flexible material. The gap between the electrodes 2 and 3 is obtained by suitably dimensioning the insulation members 5 and 6.

Figure 2 shows a further constructional example in which the electrode 2' is held in position by the lead-in 16 sealed at 4, the said electrode being a plate with a cross-section as shown in Figure 3; the shape of the electrode 3' is the same. The curved portions 11 and 12 of the electrodes are arranged to receive glass rods 5' and 6' on which the curved portions 13 and 14 of the electrode 3' are caused to fit. A flexible wire 7 connects the electrode 3' to the lead 8. The glass rods are preferably cemented to the electrodes, but a resilient member such as a spring 15 may be provided which may for example be likewise secured to the lead 8 and which presses the electrode 3' on the glass rods 5' and 6'. This particular holding arrangement is of advantage when the distance between the plates must be frequently altered. This may be done in various ways; for example, the diameter of the glass rods 5' and 6' or the curved portions of the electrodes may be altered, or additional spacers may be disposed in the said portion.

Fig. 5 illustrates a particularly advantageous construction of the arrangement according to this invention. The electrodes 2'' and 3″ are shaped somewhat the same as in Figure 3. Insulation members 5″ and 6″ are provided with metal pieces 9, 10, 17 and 18 cemented to the insulation members and secured to the lugs 19, 20, 21 and 22 by screws. The members 5″ and 6″ are preferably very long in relation to the distance between the electrodes, which simplifies considerably the production of a very small space between the said electrodes, while this space is reliably maintained when the cell is in operation. The set of electrodes may be held in position within the glass vessel 1 by means of a suitably stout current lead (for example the lead of the electrode 2″) sealed in the glass wall. The current lead of the electrode 3″ is preferably a flexible wire embedded in a seal 8. The set of electrodes 2″, 3″ need not be held on a sealed current lead, but may be carried on a support disposed on the glass wall.

The electrodes 2‴ and 3‴ of Figure 6 are similar in shape to the electrodes 2″ and 3″ of Figure 5. The two electrodes are secured together by two screws 25 and 26 insulated from the electrode 3‴ by two washers 27, 28 and 29, 30 of mica and by glass tubes 23 and 24. The distance between the two electrodes is determined by two glass tubes 29 and 31 acting as spacers.

The invention is not limited to Kerr cells but may be applied to electrode arrangements in general in which the distance between the electrodes is very small and which are disposed between glass walls.

What I claim as new and desire to secure by Letters Patent of the United States is:

1. A light control device including a receptacle, a plurality of electrodes mounted within said receptacle, a rigid member extending between one of said electrodes and the wall of said receptacle, rigid insulation spacing means interposed between said electrodes, and a flexible terminal member extending between another of said electrodes and the wall of said receptacle.

2. A Kerr cell including a receptacle, a plurality of electrodes mounted within said receptacle, a rigid terminal member attached to one of said electrodes and extending through the wall of said receptacle, rigid insulation spacing means interposed between said electrodes, and a flexible terminal member attached to another of said electrodes and extending through the wall of said receptacle.

3. A light control device including a receptacle, a plurality of electrodes mounted within said receptacle, a rigid terminal member extending between one of said electrodes and the wall of said receptacle, rigid insulaation means interposed between said electrodes, a flexible terminal member extending between another of said electrodes and the wall of said receptacle, and resilient means interposed between said wall and one of said electrodes for maintaining said electrodes in contact with said insulation spacing means.

4. A Kerr cell including a receptacle, a plurality of electrodes provided with recesses and mounted within said receptacle, a rigid terminal member extending between one of said electrodes and the wall of said receptacle, insulation means mounted in said recesses between said electrodes, and a flexible terminal extending between another of said electrodes and the wall of said receptacle.

5. A Kerr cell including a receptacle, a plurality of electrodes, a rigid member extending between one of said electrodes and the wall of said receptacle, a rigid insulation spacing member interposed between said electrodes, said spacing member having a length which is great as compared with the distance between said electrodes, and flexible means interposed between another of said electrodes and the wall of said receptacle.

6. A Kerr cell including a receptacle, a plurality of electrodes, a rigid member extending between one of said electrodes and the wall of said receptacle, a rigid insulation spacing member interposed between said electrodes, said spacing member having a length which is great as compared with the distance between said electrodes, flexible means interposed between another of said electrodes and the wall of said receptacle, and means for securing said electrodes to said insulation spacer.

7. A Kerr cell including a receptacle, a plurality of electrodes, a rigid terminal member extending between one of said electrodes and the wall of said container, rigid insulation spacing means interposed between said electrodes, a flexible terminal interposed between another of said electrodes and the wall of said receptacle and resilient means interposed between said wall and one of said electrodes for maintaining contact between said electrodes and said insulation spacer.

In witness whereof, I have hereunto set my hand this 5th day of December, 1929.

ALBERT NARATH.